United States Patent Office 2,888,042
Patented May 26, 1959

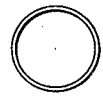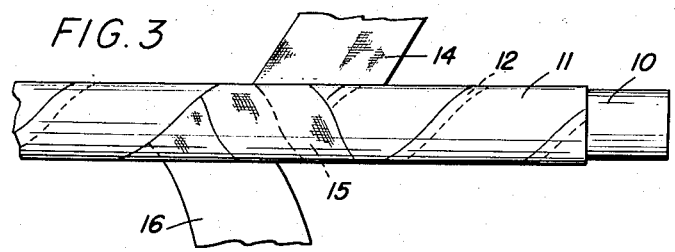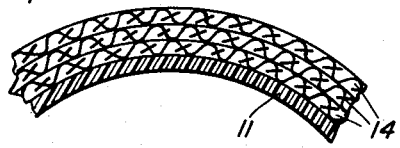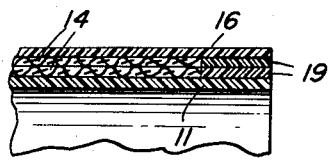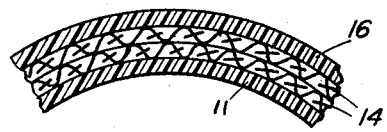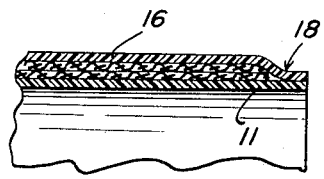

2,888,042

REINFORCED POLYTETRAFLUOROETHYLENE PIPE AND METHOD OF MAKING IT

Alexander N. T. St. John, Glen Ridge, and Benjamin M. Walker, Caldwell, N.J., assignors to Resistoflex Corporation, Belleville, N.J., a corporation of New York Application January 14, 1955, Serial No. 481,814

11 Claims. (Cl. 138—55)

This invention relates to pipe which is resistant to corrosive materials and to a method of making the same.

There is a great need for pipe capable of handling highly corrosive liquids and gases, particularly at elevated temperatures, especially in the chemical manufacturing and chemical processing industries. In other fields such as food handling and processing, distilling, electroplating, metal pickling and petroleum refining operations there are also pipe corrosion problems either from the standpoint of avoiding contamination of the fluids conducted or durability of the piping in use. The pipe of the invention has utility in all these fields.

At the present time pipe used for handling corrosive materials falls into various categories. It is made of such fragile materials as glass, porcelain and ceramic stoneware which are highly susceptible to breakage. Glass-lined steel is used which is stronger but also liable to damage from rough handling, by chipping and from mechanical or thermal shock. A wide variety of expensive metals and metal alloys are also used, many of which have high corrosion rates in some fields of use and consequent short life. Other attempts to solve corrosion problems involve the use of resin bonded graphite or asbestos, thermoplastic resins, with or without reinforcement, and rubber. These are deficient above various critical temperatures, depending on the material used. In the field of non-metallic pipe, where temperatures are experienced as high as 500° F. it has heretofore been necessary to use glass or ceramic pipe.

It is the object of the present invention to provide non-corrosive pipe which will withstand temperatures as high as 500° F., or even somewhat higher, which is tough, somewhat flexible, easily worked as, for example, by cutting or flaring, not subject to fatigue, completely impervious to highly corrosive materials over long periods of time, and has high resistance to abrasion.

The pipe of the invention is essentially composed of polytetrafluoroethylene ("Teflon") reinforced with glass fabric. It is essential, of course, that the pipe be completely impervious over long periods to highly corrosive chemicals. In attempting to make such reinforced Teflon pipe by the methods usually followed with other synthetic resins and reinforcement no success was achieved. Pipe made from Teflon-impregnated glass fabric wrapped on a mandrel and heated to bond the layers resulted in a porous pipe. Teflon can be coated on fabric only as a dispersion, since it cannot be formed into a solution, and when the dispersing medium is evaporated numerous voids result allowing chemical attack on the glass fibers. Even heating of the built up pipe to above the sintering or transition temperature of the Teflon, while under pressure, fails to eliminate this porosity. Skived tape of Teflon, made by cutting from solid cylinders, added to the laminae of the pipe failed to overcome the porosity of the pipe though the layers of tape were readily fused together and to the Teflon impregnated fabric layers. The same difficulty was experienced in adding layers of Teflon film formed by other processes involving the sintering or fusion of the Teflon particles. Although the pipe thus lined with a solid Teflon layer appeared to be impervious when first put into use, with time it developed leaks when subjected to corrosive chemicals.

The present invention resides in the discovery that a completely impervious laminated pipe composed of Teflon and glass fabric can be made by forming the pipe with a lining or intermediate layer made in a particular manner, namely from one or more layers of unfused or unsintered Teflon film or tubing formed by the so-called paste extrusion process, this lining then being fused or sintered for the first time when the pipe which comprises it is heated to fuse its laminae into a solid integral wall. Of course, the most advantageous place to use the impervious Teflon layer is on the inner surface of the pipe as a liner.

In making a sheet of Teflon by paste extrusion, Teflon powder is admixed with an extrusion aid or lubricant, preferably naphtha thickened with a small amount of polyisobutylene ("Vistanex"), and extruded to the desired shape, passing then through a heated zone at a temperature which causes the evaporation of the lubricant and then through an oven at a higher temperature which sinters or fuses the Teflon particles into a very tough homogeneous body. The material which is used according to the invention is not the final sintered product but the intermediate product from which the volatiles have been removed but which has not been heated to sintering temperature or fused. This material may be in the form of tubing which can be slipped on a mandrel or tape which can be spirally wrapped on the mandrel with an overlap, or long sheets which can be longitudinally wrapped on the mandrel. Spiral wrapping of the tape is generally the most satisfactory.

The above referred to method of making Teflon sheet, tubing or tape by so-called paste extrusion is more fully described in the Information Bulletin No. X–55 published by E. I. du Pont de Nemours & Co., Wilmington, Del., under the title " 'Teflon' Tetrafluoroethylene Resin, Extrusion of Compounded Teflon," and other paste extrusion methods are described in U.S. Patent 2,685,707 granted to said company on Aug. 10, 1954. The primary characteristics of the so-called paste are that the Teflon particles are of colloidal size and that they are thoroughly admixed with organic lubricant, such as the thickened naphtha above referred to. When this paste is subjected to pressure or rubbing, such as takes place in extrusion, the particles adhere together sufficiently to product an article, such as a sheet, tape or tube, which can be handled but which does not have much mechanical strength. It is less rigid than the fused material and can be conformed more closely to a mandrel, when wrapped in superposed layers.

The invention will best be understood from the following detailed description of an illustrative embodiment thereof, taken in conjunction with the drawings in which:

Fig. 1 is an elevation of a short section of pipe made by a spiral wrapping process and flared at one end to receive a coupling;

Fig. 2 is an end view as seen from the right of Fig. 1;

Fig. 3 is an elevation showing a mandrel and various laminae being wrapped thereon in the form of tape to produce a pipe;

Figs. 4 and 5 are fragmental cross-sections through a portion of a pipe wall on an enlarged scale; and Figs. 6 and 7 are views showing modified end constructions.

Referring to the drawings, Fig. 3 shows a mandrel 10 of suitable smooth-surfaced metal such as polished steel, chromium plated steel, stainless steel or the like. This mandrel may first be lubricated generously with silicone oil, such as mold release oil, and prebaked at 750° F. for about an hour to facilitate removal of the finished pipe. Optionally, after baking, it may be given a second coating of silicone oil. A layer of unfused paste-extruded Teflon tape 11, as above described, is then helically wrapped thereon with an overlap as shown at 12 to form a continuous impervious lining for the pipe. Over this lining one or more reinforcing layers of Teflon impregnated glass fabric 14 are then wrapped helically in the opposite direction, the amount of overlap 15 and the number of layers depending upon the thickness and strength of the pipe wall desired in the finished product. Only one such layer has been shown as illustrative. As a final outside layer, unfused paste-extruded tape 16 may be helically wrapped over the last layer of impregnated glass fabric, thus forming an impervious outer covering. Such a covering, however, is not usually required except where the pipe is to be exposed to corrosive materials both inside and outside as would be the case with a dip-pipe. Upon the laminae of the pipe thus built up may then finally be wrapped one or more layers of plain glass fabric tape, as described in our copending application Serial No. 440,802, filed July 1, 1954, now Patent No. 2,783,173, issued February 26, 1957, for the purpose of applying pressure to the laminae when the pipe is heated.

When all of the wrappings are in place, the mandrel is placed in or passed through an oven for sintering the unfused Teflon and for bonding the several layers together under conditions which will raise its temperature above about 620° F. which is the fusion temperature of the material and below about 930° F., above which the rate of decomposition becomes excessive. Preferably, this heating takes place in the temperature range between 680° F. and 750° F. Upon cooling, the outer wrapping of glass tape is removed and the finished pipe is removed from the mandrel.

Fig. 4 is a fragmental view showing, by way of illustration, a pipe wall with an inner lining 11 of Teflon and three superposed layers 14 of Teflon-impregnated glass fabric. Actually, in the finished product all of the layers fuse into a solid wall containing the reinforcement.

Fig. 5 shows a construction which differs only in that it has two intermediate layers of Teflon-impregnated glass fabric 14 and an outer covering 16 of Teflon. Such a construction would be useful as a dip-pipe and wall thickness may be built up by increasing the number of the reinforcing layers 14.

Where the pipe is to be used under such conditions that it is exposed on both sides to corrosive materials, as, for example, in a dip-pipe, it is desirable to seal the end of the pipe which is submereged so that the corrosive materials do not have access to the glass-fabric reinforcing layers. One method of thus sealing the end is shown in Fig. 7 which has a wall structure corresponding to Fig. 5. The outermost Teflon layer 16 is sealed at the end directly to the innermost Teflon layer 11 as shown at 18, the intermediate glass fabric layers being stepped back so as to bring these inner and outer layers into juxtaposition. Another method of end sealing is shown in Fig. 6 wherein the intermediate layers 14 of impregnated glass fabric are cut off short of the innermost layer or lining 11, and a number of layers of unfused paste-extruded Teflon tape 19, corresponding in thickness to the intermediate layers 14, are wrapped around the lining to build up the end portion of the pipe wall and are covered over by the outer layer 16, all of these layers being fused together during sintering to form a solid Teflon end. The necessity for such end seals is due to the fact that without them the impregnated glass fabric or its bond to the Teflon is liable to be deteriorated by chemical attack.

It is to be understood that numerous variations may be made in the illustrative embodiments of our invention as above described, which is not limited thereto but may be practiced in other ways within the purview of the appended claims. For convenience throughout the claims, polytetrafluoroethylene will be represented by the abbreviation, P.T.F.E.

What is claimed is:

1. Chemically inert pipe comprising a lining of P.T.F.E. bonded to at least one layer of reinforcing glass fabric pre-impregnated with P.T.F.E., said lining being the result of sintering in situ unfused paste-extruded P.T.F.E. laminated with said reinforcing layer into pipe form.

2. Chemically inert pipe comprising a lining of P.T.F.E. bonded to at least one layer of glass fabric pre-impregnated with P.T.F.E. dispersion, said lining being the result of sintering in situ spirally wrapped unfused paste-extruded P.T.F.E. sheet material.

3. Chemically inert pipe comprising a lining and an outer layer of P.T.F.E. bonded to a plurality of intermediate layers of glass fabric pre-impregnated with P.T.F.E. dispersion, said lining and outer layer having been fused in situ from unfused paste-extruded P.T.F.E.

4. Chemically inert pipe comprising a lining of P.T.F.E. bonded to a plurality of bonded layers of glass fabric pre-impregnated with P.T.F.E., said lining having been fused in situ from unfused paste-extruded P.T.F.E. and simultaneously bonded to said fabric layers 5. A dip-pipe for use in corrosive chemicals comprising a pipe formed of a plurality of intermediate layers of P.T.F.E.-impregnated glass fabric, an inside layer of paste-extruded P.T.F.E., and an outside layer of paste-extruded P.T.F.E., all of said layers being fused together, the ends of said intermediate layers being covered over by a layer of P.T.F.E. fused to said inside and outside layers.

6. A dip-pipe for use in corrosive chemicals comprising a pipe formed of a plurality of intermediate layers of P.T.F.E.-impregnated glass fabric, an inside layer of paste-extruded P.T.F.E., and an outside layer of paste-extruded P.T.F.E., all of said layers being fused together, the end portions of said inside and outside layers extending beyond said intermediate layers and being fused directly to each other.

7. A dip-pipe for use in corrosive chemicals comprising a pipe formed of a plurality of intermediate layers of P.T.F.E.-impregnated glass fabric, an inside layer of paste-extruded P.T.F.E., and an outside layer of paste-extruded P.T.F.E., all of said layers being fused together, the end portions of said inside and outside layers extending beyond said intermediate layers with the space between said extended end portions being filled with P.T.F.E. to which said end portions are fused to form a solid impervious body.

8. The method of making chemically inert pipe which comprises the steps of placing on a mandrel a continuous layer of unfused paste-extruded P.T.F.E. free of volatile constituents, wrapping thereon at least one layer of P.T.F.E.-impregnated glass fabric, heating said layers on the mandrel under externally applied pressure to a temperature above the fusion temperature and below the decomposition temperature of P.T.F.E. to sinter the unfused P.T.F.E. and bond said layers together, and removing the resultant pipe from the mandrel.

9. The method of making chemically inert pipe which comprises the steps of wrapping on a mandrel at least one layer of unfused P.T.F.E. sheet material produced by paste extrusion, wrapping thereon at least one layer of P.T.F.E. impregnated glass fabric, heating said layers on the mandrel to a temperature above the fusion temperature and below the decomposition temperature of P.T.F.E. to sinter the unfused P.T.F.E. and bond said layers together, and removing the resultant pipe from the mandrel.

10. The method of making chemically inert pipe which comprises the steps of spirally wrapping on a mandrel at least one layer of unfused P.T.F.E. tape produced by paste extrusion, spirally wrapping thereon a plurality of layers of glass fabric impregnated with P.T.F.E. dispersion, heating said layers on the mandrel to a temperature above the fusion temperature and below the decomposition temperature of P.T.F.E. to sinter the unfused P.T.F.E. and bond said layers together, and removing the resultant pipe from the mandrel.

11. The method of making chemically inert pipe which comprises the steps of wrapping on a mandrel at least one layer of unfused paste-extruded P.T.F.E., wrapping thereon at least one layer of P.T.F.E.-impregnated glass fabric, wrapping thereover an outer layer of unfused paste-extruded P.T.F.E. heating said layers on the mandrel under externally applied pressure to a temperature above the fusion temperature and below the decomposition temperature of P.T.F.E. to sinter the unfused P.T.F.E. and bond said layers together, and removing the resultant pipe from the mandrel.

References Cited in the file of this patent

UNITED STATES PATENTS

| | | |
|---|---|---|
| 2,312,282 | Peet | Feb. 23, 1943 |
| 2,454,625 | Bondon | Nov. 23, 1948 |
| 2,459,653 | Keyes | Jan. 18, 1949 |
| 2,539,329 | Sanders | Jan. 23, 1951 |
| 2,594,693 | Smith | Apr. 29, 1952 |
| 2,631,630 | Brady et al. | Mar. 17, 1953 |
| 2,653,887 | Slayter | Sept. 29, 1953 |
| 2,685,707 | Llewellyn et al. | Aug. 10, 1954 |
| 2,691,694 | Young | Oct. 12, 1954 |
| 2,728,698 | Rudner | Dec. 27, 1955 |
| 2,731,068 | Richards | Jan. 17, 1956 |

OTHER REFERENCES

Modern Plastics, October 1948, pages 168, 170 and 172. (Copy in Div. 67.)

Plastics, July 1946, pages 32, 34 and 97. (Copy in Div. 67.)